United States Patent
DeLuca et al.

(10) Patent No.: US 10,324,603 B2
(45) Date of Patent: Jun. 18, 2019

(54) MODIFYING THE APPEARANCE OF OBJECTS BASED ON A PROGRESS OF A TASK

(71) Applicant: International Business Machines Corporation, Armonk, NY (US)

(72) Inventors: Lisa Seacat DeLuca, Baltimore, MD (US); Clifford A. Pickover, Yorktown Heights, NY (US); Dana L. Price, Surf City, NC (US); Aaron J. Quirk, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 394 days.

(21) Appl. No.: 15/155,093

(22) Filed: May 16, 2016

(65) Prior Publication Data

US 2017/0329497 A1     Nov. 16, 2017

(51) Int. Cl.
*G06F 3/048* (2013.01)
*G06F 3/0484* (2013.01)
*G06F 3/0481* (2013.01)
*G06F 11/30* (2006.01)
*G06F 11/32* (2006.01)
*G06Q 10/10* (2012.01)

(52) U.S. Cl.
CPC ........ *G06F 3/04845* (2013.01); *G06F 3/0481* (2013.01); *G06F 3/04812* (2013.01); *G06F 3/04817* (2013.01); *G06F 11/302* (2013.01); *G06F 11/328* (2013.01); *G06Q 10/109* (2013.01)

(58) Field of Classification Search
CPC .......................... G06F 3/04845; G06F 3/0481
USPC ......................... 715/802, 771, 772
See application file for complete search history.

(56) References Cited

U.S. PATENT DOCUMENTS

| 2004/0078453 | A1* | 4/2004 | Bhogal | H04L 67/06 709/219 |
| 2009/0064143 | A1* | 3/2009 | Bhogal | G06F 9/542 718/100 |
| 2012/0293327 | A1 | 11/2012 | Mountain | |
| 2015/0046840 | A1 | 2/2015 | Hayman | |

OTHER PUBLICATIONS

IBM et al., "Attracting Attention to a Displayed Object", IP.com No. 000123643, Feb. 1, 1999, 2 pages.
IBM, "Application Status Notification by Change in Title Bar Icon", IP.com No. 000011526, Feb. 26, 2003, 2 pages.

* cited by examiner

*Primary Examiner* — Andrey Belousov
(74) *Attorney, Agent, or Firm* — Cantor Colburn LLP; Isaac Gooshaw

(57) ABSTRACT

A computer-implemented method, system, and computer device for modifying an appearance of an object in an electronic display of a computer device based on a progress of a task is provided. The method includes monitoring a progress of a first task of a first application. The method also includes identifying a first object of a second application, and modifying an appearance of the first object of the second application based on the progress of the first task, wherein the second application is distinct from the first application.

17 Claims, 4 Drawing Sheets

FIG. 4A

| Object | Customization |
|---|---|
| Main Character shirt | Blue, Green, Yellow, Orange |
| Background weather | Snowing, Raining, High winds |
| Background sounds | Baby Crying, dog howling, man whistling |
| Image blowing across screen | Envelope, Lady bug, User-provided JPEG file |

FIG. 4B

| Event | Customization |
|---|---|
| 0-33% Progress | |
| 34-66% Progress | |
| 67-99% Progress | |
| 100% Progress | |

FIG. 4C

| Event | Object | Customization |
|---|---|---|
| 0-33% Progress | Main Character shirt | Blue |
| 34-66% Progress | Main Character shirt | Green |
| 67-99% Progress | Main Character shirt | Yellow |
| 100% Progress | Main Character shirt | Orange |

FIG. 4D

| Event | Object | Customization |
|---|---|---|
| Weather Alert | Snowing | Weather display |
| Chat | Sound | Dog Howling Sound |
| Email | Envelope | Blowing across display |
| Calendar | Alarm | User-provided JPEG file |

MODIFYING THE APPEARANCE OF OBJECTS BASED ON A PROGRESS OF A TASK

BACKGROUND

The present invention relates to tracking the progress of a task, and more specifically, to a method, system, and device for modifying an appearance of an object in an electronic display of a computer device based on a progress of a task.

As users of mobile and computer devices perform concurrent tasks, the display area of their devices can become crowded with multiple windows and applications. While performing a task such as downloading, updating, and installing software, it is common for the task to display a progress bar for tracking the completion of the task. However, as multiple windows and applications are opened, the progress bar is oftentimes minimized or obstructed by an overlapping window, making it difficult for users to determine the completion of the particular task associated with the progress bar. These problems can be increased as overlapping windows, multiple screens, multiple applications, and different desktop portals compete for the limited display area. Also, users may become impatient and prefer to use other applications while downloads, updates, and installations are progressing in the background. Additionally, such problems are further increased on mobile devices with limited screen real estate, where a progress bar occupies valuable space that the user may not want to dedicate for background activity.

SUMMARY

According to one or more embodiments of the present disclosure, a computer-implemented method, system, and computer device for modifying an appearance of an object in an electronic display of a computer device based on a progress of a task is provided. The method also includes monitoring a progress of a first task of a first application. The method includes identifying a first object of a second application and modifying an appearance of the first object of the second application based on the progress of the first task, wherein the second application is distinct from the first application.

BRIEF DESCRIPTION OF THE DRAWINGS

FIGS. 4A, 4B, 4C, and 4D illustrate tables of configurations for modifying an appearance of an object in an electronic display of a computer device based on a progress of a task in accordance with one or more embodiments.

DETAILED DESCRIPTION

Figure 1:
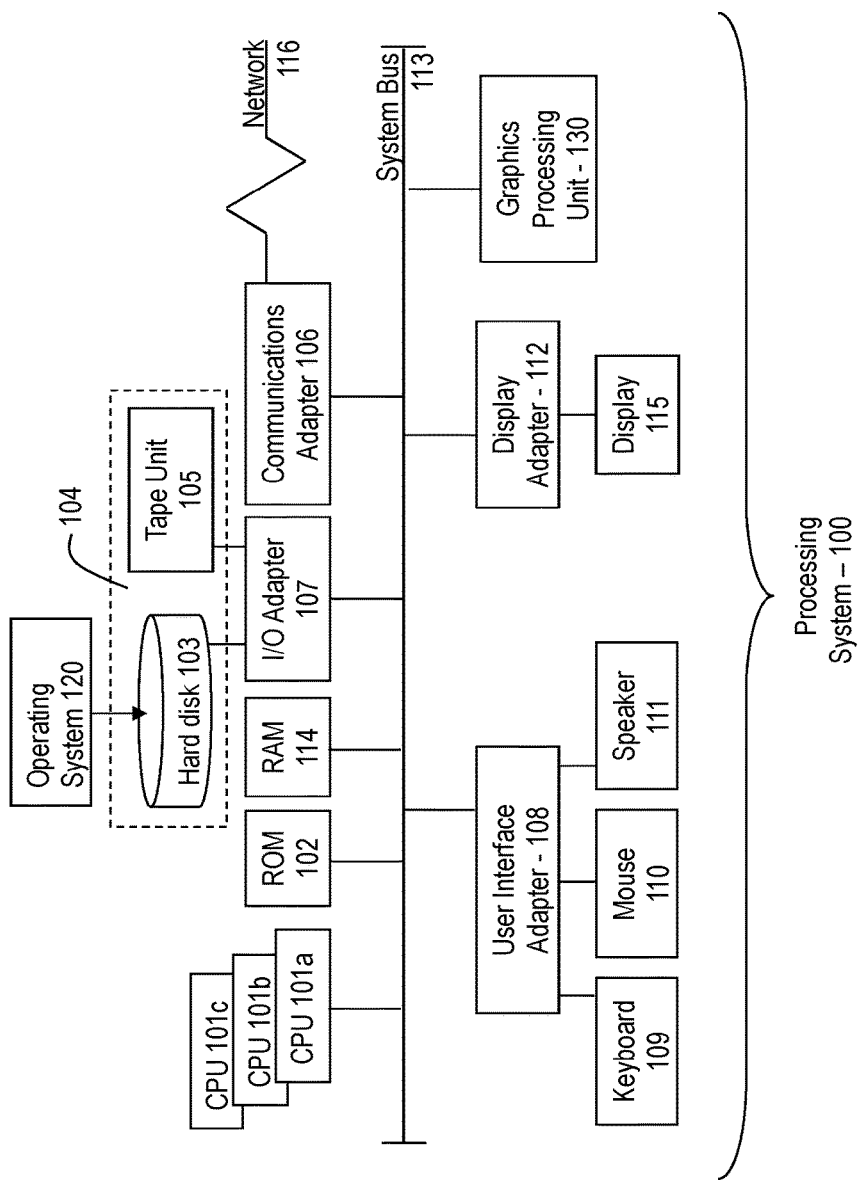
FIG. 1 is a block diagram illustrating one example of a processing system for practice of the teachings herein.

An aspect of the disclosure includes manipulating an object in an application running in a focused application window to indicate a status of a background task. In one or more embodiments, the focused application window can be an active, topmost, or visible window. As a background task is progressing, the object in a window or application running in the foreground may continuously be modified to indicate the status of the task. In an exemplary embodiment, the visual appearance of a selected object can be manipulated according to a configuration, where various features of the object in the focused application can be modified. A focused application is an application running in a focused window where the user has an unobstructed view of the window or a window that is visible to the user (i.e. multiple windows may be visible as they are possibly laid out in a non-overlapping fashion). A non-focused application may be a window that is being overlapped by another window or an unobstructed window that is not the being targeted by the user. Static and dynamic objects are able to be configured for tracking the progress of the background task.

In another embodiment, the object can be a static object such as a border of a window that can change color or flash to track the progress of a non-focused window or background task. Additionally, the object can be a dynamic object such as a character in a video game that is able to travel through different stages or scenes.

In other embodiments, the status of a task can be "handed-off" as a user transitions and focuses on different windows or applications. For example, a user may decide to change from a gaming application to an email application while performing an unrelated background task of downloading a song. The status of a previously manipulated object of a focused window can be "handed-off" to a different object of a newly focused window. These manipulated objects can be preconfigured or can be selected by a user based on a user's preference allowing a further level of personalization. The settings can be configured through an application program interface API that is accessible to a user.

In an embodiment, when transitioning to a new window, the object used to track the initial background task can optionally be changed to a different object in the new window to track the progress of the background task. If the user's eye gaze changes for a period of time, a progress change may be triggered. In another embodiment, if a user's calendar indicates a likely change of attention, a progress change may be triggered.

In an embodiment, a plurality of background tasks may be tracked by a plurality of objects of an application where the tasks are unrelated to the application of a focused window. In an exemplary embodiment, a user may run multiple tasks, such as upgrading a program and downloading a song simultaneously. If the focused application is running in a window, as an example, the top border of the window can be used to indicate a status of the first task (upgrading the program) and the bottom border of the window can be used to indicate the status of the second task (downloading a song). The borders can be manipulated to indicate the status of the task where various colors can indicate the progress of the task.

After receiving the final indication that a task has been completed, the user can determine the appropriate course of action. The user can dismiss the alert/notification or answer any relevant queries associated with the task such installing a program that has been downloaded. If another background task is started, the process can repeat itself to manipulate an object in the focused window to provide a status of the unrelated background task. Also, any queries that need to be answered during a background activity (such as installation process) can be fed into the current foreground application such as a game, eBook, word processor and the like, so the user can respond to the queries without leaving his or her current context or window.

Referring to FIG. 1, an exemplary system for modifying an appearance of an object in an electronic display of a computer device based on a progress of a task is provided. In FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Figure 2:
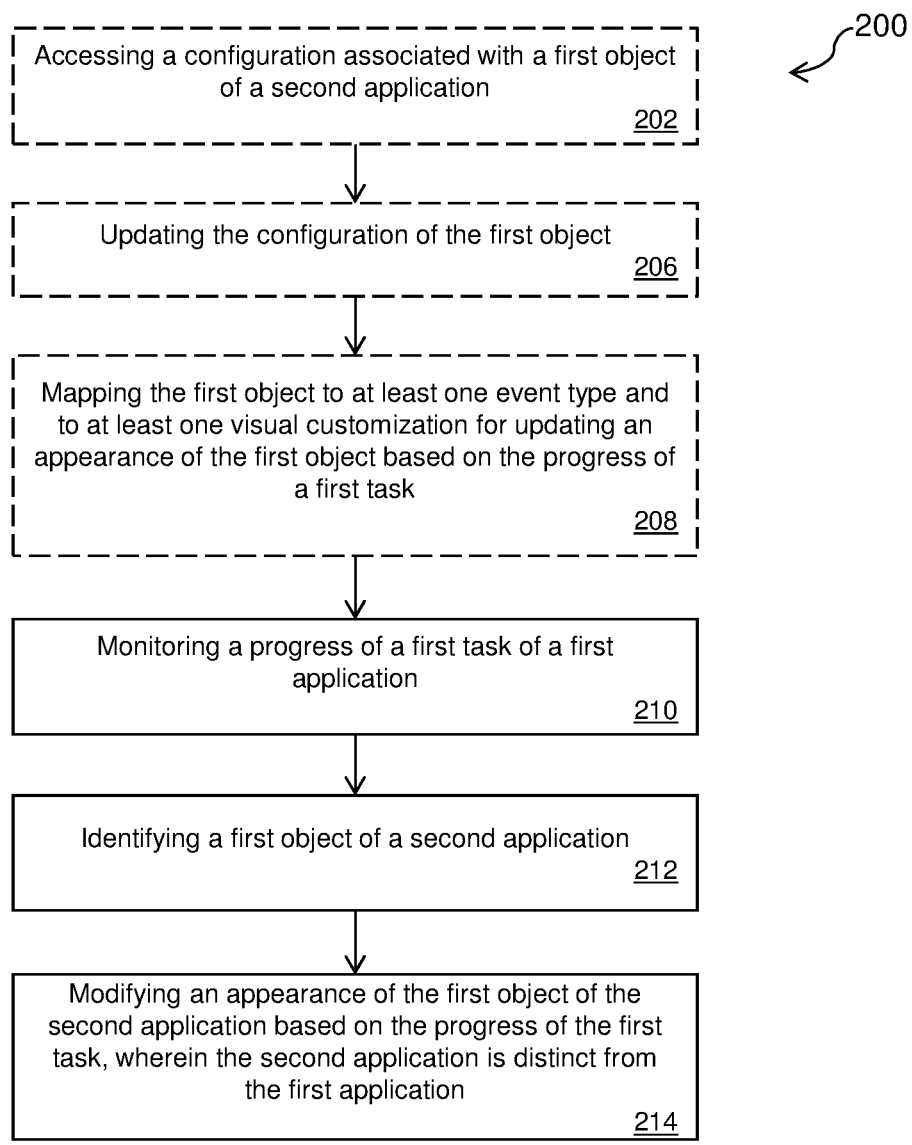
FIG. 2 is a flow diagram of an illustrating one example of modifying an appearance of an object in an electronic display of a computer device based on a progress of a task in accordance with one or more embodiments.

With reference now to FIG. 2, a method 200 for modifying the appearance of an object in an electronic display of a computer device based on a progress of a task is shown. Computer or computing devices include devices such as laptops, mobile devices, PDAs, digital readers, wearable technology, etc. Optional block 202 of method 200 includes accessing a configuration associated with a first object of a second application. In an embodiment, the first application can be a word processing application and the configurations for the application can include modifying the appearance of a border of the application or the color/font/size of a window title bar, or having menus appear and disappear.

A computer system environment can include a number of applications. It is known to one having ordinary skill in the art the application or program can be any type of program including but not limited to email applications, music players, social media applications, video games, and the like. Any enabled applications (applications that have been configured to allow access to their APIs for customization) can include a list of visual elements inside the application and the types of modifications supported. In addition, the system can provide basic modifications. Each participating application provides access to its API for other applications or the O/S to modify the visual environment of the currently running application. In an embodiment, system applications can be modified by APIs that already exist, such as changing the color of a window border, changing the color/font/size of a window title bar, controlling whether a border flashes or not, whether menus appear or disappear, and the like. However such modifications are not limited to those mentioned above. It is known to one of ordinary skill in the art that visual modifications can extend to many other types of objects of a program. The object can be, but is not limited to, a window border or a section of the screen (for example, the heading text within a web browser). In another embodiment, an object can include a portion of a particular object such as the t-shirt, hat, and color of a virtual character (avatar). In other embodiments, an object can include the system element such as the taskbar, system time, etc.

Optional block 206 includes updating the configuration of the first object, and optional block 208 includes mapping the first object to at least one event type and to at least one visual customization for updating an appearance of the first object based on the progress of the first task. Event types include but are not limited to tracking the progress of a task for installing, upgrading, downloading data or programs, etc. Visual customizations include but are not limited to colors, patterns (dynamic or static), sounds, haptic feedback, and the like. Examples of dynamic patterns include various flashing patterns, and examples of static patterns include stripes or patterns having a plurality of repetitive shapes.

After an application provider exposes customizations of the application, it is determined if other aspects of the object visualizations are to be customized. If it is determined that further customizations are desired, the type of customization and number of variations are identified in the application. If it is determined that customization is complete, the customizations are made available to the operating system via APIs. After processing by the O/S, the application is delivered and executed to modify the object of an application to track the progress of the background task.

Block 210 of method 200 shows monitoring a progress of a first task of a first application. The monitoring of the progress of the first task can be accomplished through a push-type or pull-type implementation. In a push-type implementation, various applications transmit or push updates or notifications associated with an unrelated background task to a listening operating system or application running in the foreground. In a pull-type implementation, an operating system or application is able to periodically poll the background tasks for updates or notifications. In an exemplary embodiment, a processor or program interfaces with an API of the application that is focused on the display. In an embodiment, the foreground application receives, via an operating system of the computer device or application, an event notification of an unrelated background task. Event notifications include updates relating to a progress of the unrelated background task or an alert associated with a background task or application.

Block 212 depicts identifying a first object of a second application. In an embodiment, a user is capable of running a plurality of applications in a plurality of different windows on a device. The windows for the various applications can overlap one another and be maximized or minimized. Windows containing applications that are not of interest can be sent to the background and those that are of interest can be focused in the forefront of the display in a focused window. For a level of personalization and customization in an embodiment, users are able to perform the configurations according to their personal preferences. In another embodiment, the configurations can be default configurations or can be configured automatically by the system. In a different embodiment, the configurations can be applied globally to a plurality of applications of the device.

Block 214 provides for modifying an appearance of the first object of the second application based on the progress of the first task, wherein the second application is distinct from the first application. An embodiment includes further comprising simultaneously modifying the first object of the second application based on a progress of the first task of the first application and modifying a second object of the second application based on a progress of a second task of a third application, wherein the first application, the second application, and the third application are distinct from one another.

In another embodiment, responsive to a determination that an application of a focused window supports tracking the progress of the first task of the first application, modifying the appearance of an object of the application of the focused window based on the progress. In an embodiment, the focused application running in a focused window can be a word processing application and it is determined whether the application supports the modification of an object for tracking the progress of a background task such as downloading a song. As an example, the border of the focused window can be configured to track the progress of the background task. If it is determined the configuration is not supported by the focused application, a user may be prompted to enter a configuration.

One embodiment includes changing to a new application running in a focused window; transitioning, from the first object of the second application to a new object of the new application to modify an appearance of the new object based on the progress of the first task of the first application, and modifying the appearance of the new object based on the progress of the first task. In another embodiment, a further step of determining whether the task is a long running task is included. Responsive to the determination, an object of the focused application can be modified to track the progress of the background task. Otherwise, the first object is not updated. The determination can be based on a default or configurable threshold which indicates a duration for the task to be completed. For example, a task such as a download that takes longer than 2 minutes or an upgrade that takes longer than 5 minutes can be configured to invoke the manipulation of an object of the focused application. Implementing thresholds will reduce the processing required to modify an object of an application for tasks that are shorter than the threshold in duration.

The status can be related to the progress of completion for a download or an upgrade/installation of a program or application. Upon completion of the background task, a query can be provided to an application running in the foreground, where the query is related to the background task. For example, upon the completion of downloading a program, a query may be inserted into the foreground application to install the program that was downloaded in the background. The user would be able to respond to the query without leaving the current window. As a new task begins, where the task utilizes a progress bar, the method can be repeated.

The progress of a task can be tracked based on the appearance of the object. In one or more embodiments, the color or pattern of the object can change and be continuously updated. In another embodiment, the border of a window can be filled or altered. In a further embodiment, the theme or background can be modified. The gradient, opacity, or size of a selected object can be changed. In another embodiment, the texture, blink rate, sound, or symbol representing an object can change based on the status of the progress. In other embodiments, a sign may appear in a virtual world with graphical and/or textual information or other styling changes can occur. In an embodiment, when a first object used for tracking the progress of a background task of a different application is not available in a new application, a default object can be used to track the status of the background task. The default object tracks the status of the background task that was previously being tracked by the first object. In another embodiment, a different type of object can be configured to take over the tracking of the status as a user transitions between applications. In an example, the first object can be a border of the window and a subsequent object in a different application can use the title bar to indicate the progress of the background task.

Figure 3A:
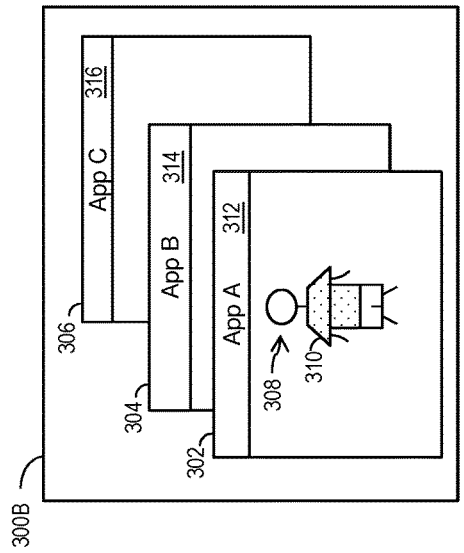
FIGS. 3A, 3B, 3C, and 3D are block diagrams illustrating modifying an appearance of an object in an electronic display of a computer device based on a progress of a task in accordance with one or more embodiments.

FIGS. 3A, 3B, 3C, 3D illustrate monitoring the progression of a background task while a video game is a focused application. FIG. 3A shows a display 300A having a plurality of overlapping windows 302, 304, and 306 open running different applications App A 312, App B 314, and App C 316 respectively. In an exemplary embodiment, a background task includes downloading a movie while playing a video game in the focused window 302. Windows 304 and 306 are capable of running other applications and the progress bar for downloading the movie is either minimized or obstructed from view. Window 302 is the focused window which was brought to the foreground of the display. The main character 308 is wearing a shirt 310 which reflects a status of the background task (download status of the movie). According to the configuration as referenced in FIG. 4B, a blank shirt indicates the download progress of the movie is between 0-33% complete.

Figure 3B:
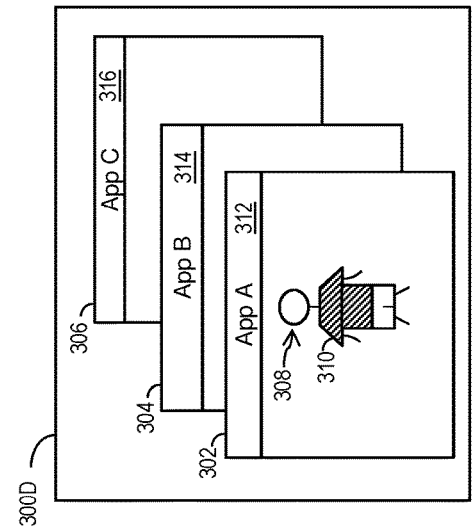

FIG. 3B illustrates a display 300B, similar to the display 300A shown in FIG. 3A. FIG. 3B shows a display 300B having a plurality of overlapping windows 302, 304, and 306 open running different applications App A 312, App B 314, and App C 316 respectively. The main character 308 is wearing a shirt 310 where the shirt is indicating a pattern. According to the configuration referenced in FIG. 4B, the main character's shirt indicates the progress of downloading the movie is between 34-66%. The main character 308 is dynamic and is not restricted to a portion of the window 302. As the main character 308 moves throughout each scene or stage of the game, the object which is the main character's shirt 310 continuously provides the current status of the downloading task.

Figure 3C:
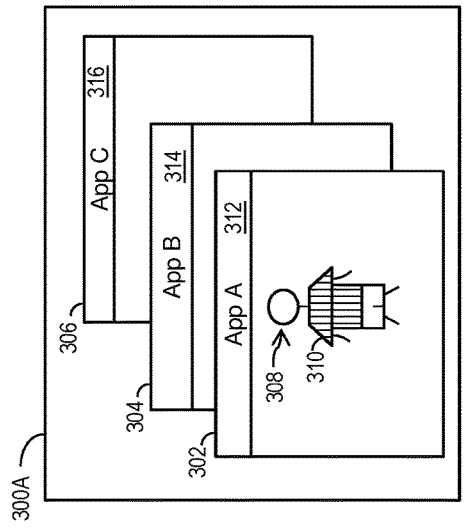

FIG. 3C illustrates a display 300C, similar to the display 300A shown in FIG. 3A. FIG. 3C shows a display 300C having a plurality of overlapping windows 302, 304, and 306 open running different applications App A 312, App B 314, and App C 316 respectively. As the dynamic character 308 moves throughout the video game, the object 310 (main character's shirt) continuously changes and tracks the status of the background task. According to the configuration referenced in FIG. 4B, the main character's shirt indicates the progress of downloading the movie is between 67-99%.

Figure 3D:
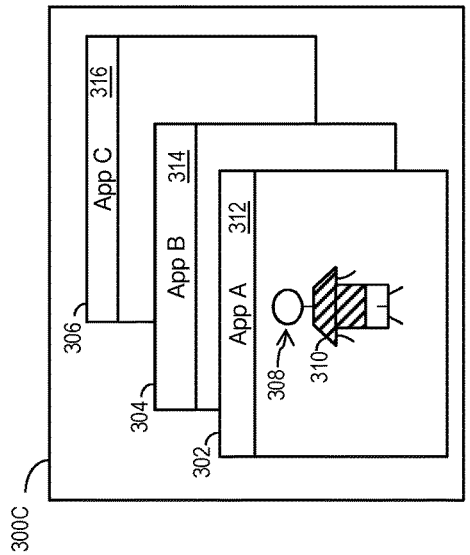

FIG. 3D illustrates a display 300D, similar to the display 300A shown in FIG. 3A. FIG. 3D shows a display 300D having a plurality of overlapping windows 302, 304, and 306 open running different applications App A 312, App B 314, and App C 316 respectively. The dynamic character 308 and dynamic object 310 (main character's shirt) continuously change and track the status of the background task. The main character's shirt 310 indicates the download is complete according to the configuration referenced in FIG. 4B. Upon completion of the task, the object 310 can return to normal or maintain its status until a user takes some action. In another embodiment, a notification or query can be fed into the video game application so the user can take an action without leaving the current window. For example, a query may be inserted into the video game application after completing a program download, where the query prompts the user to install the downloaded program. The downloaded program can be installed without the user leaving the video game application. As a new task or simultaneous background tasks begin, the process can be repeated.

FIG. 4A shows an exemplary configuration of a video game that allows for a level of customization. These configurations can be made available to a user by an application provider to configure preferences for object manipulation for indicating the status of an unrelated program when running the application. In an embodiment, the objects in a video game context can include a main character's shirt, background weather, background noise, and images that can be seen moving across the screen. The associated visual customizations range from various colors, weather, sounds, and images that can be modified. It is known to one of ordinary skill in the art that objects are not limited to the video game context.

FIG. 4B depicts an exemplary configuration of a table mapping an event type to a customization. In this example, the event type indicates a range of progress completion for a task that is running concurrently with other applications. The customization according to this example uses patterns. A first pattern indicates the progress of the task is 0-33% completed, and a second shaded pattern indicates the progress of the task is 34-66% completed. A third shaded pattern indicates 67-99% completion, and a fourth densely shaded pattern indicates a 100% completion. The patterns may be configured to apply to various objects of the different programs. In a different embodiment, upon 100% completion, the appearance of the object can return to normal or provide an alert to the user. In an exemplary embodiment, the table shown in FIG. 4B can be provided to the user in the focused application as a legend to track the status of the background task.

FIG. 4C illustrates an exemplary embodiment of a video game. A character of a video game can be manipulated to indicate the progress of a task that is running in the background. The main character's shirt can be configured as the object to be manipulated. FIG. 4C depicts the main character's shirt can change colors based upon the progress. For instance, if the background task such as the downloading of a program is 0-33% complete the main character's shirt would be modified to a blue color. As the download progresses to 34-66% the color of the shirt changes to green and when 67-99% the color changes to yellow. Finally, when the download is complete, the main character's shirt is orange. In this exemplary embodiment, the main character's shirt is a dynamic object. The main character continues to move throughout the game while simultaneously updating the shirt throughout the game. Dynamic objects are not limited to one location relative to the application. Static objects that can be manipulated include borders of a window, a title bar of the window, and the like. Also, an indication can be signaled to a user when the task has been corrupted or an error has occurred, such as the main character's shirt can start to flash. The various ranges and colors for tracking progress can be configured.

FIG. 4D shows an exemplary mapping of various event types and customizations for an application or global configuration for participating applications for detecting background tasks. The mappings include a variety of alerts such as weather alerts, chat requests, email notification, and calendar alarms. It is readily known to one having ordinary skill in the art, these indications are only examples and can extend to any type of alert or notification such as social media notification and scheduled events and are not limited to these examples. FIG. 4D depicts a detected event being a weather alert and the customization is mapped to modifying the display of an associated application. A chat alert can be indicated by a dog howling sound. An email alert can entail an envelope passing across the screen. A calendar alarm can be indicated by a user provided JPEG file. In one or more embodiments, users are able to upload personal files to be used as an object such as a music file or sound file, image, video, avatar and the like.

In another embodiment, when the progress of an unrelated background task is approaching 100%, a user's avatar can be teleported, with permission, from a current region of the world to a special region of the world in order to view additional information, or controls, without actually leaving the virtual 3D world.

A benefit to a user is to show the status of a background task of an unrelated application in a way that is thoroughly integrated within the current application's visual experience, without taking the user out of the current application's context. Users are no longer required to keep the progress bar visible on the display, taking up valuable limited space or distracting the user from the focused application.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for modifying an appearance of a first object in an electronic display of a computer device based on a progress of a first task, the method comprising:
    monitoring the progress of the first task of a first application;
    identifying the first object of a second application;
    modifying the appearance of the first object of the second application based on the progress of the first task, wherein the second application is distinct from the first application;
    changing to a new application running in a focused window;

transitioning, from the first object of the second application to a new object of the new application to modify an appearance the new object based on the progress of the first task of the first application; and
modifying the appearance of the new object based on the progress of the first task.

2. The method of claim 1, further comprising, accessing a configuration associated with the first object of the second application;
updating the configuration of the first object; and
mapping the first object to at least one event type and to at least one visual customization for updating the appearance of the first object based on the progress of the first task.

3. The method of claim 1, wherein the monitoring is selected from a group comprising a push-type interaction with the first application and a pull-type interaction with the first application.

4. The method of claim 1, further comprising simultaneously modifying the first object of the second application based on a progress of the first task of the first application and modifying a second object of the second application based on a progress of a second task of a third application, wherein the first application, the second application, and the third application are distinct from one another.

5. The method of claim 1, further comprising, responsive to a determination that an application of a focused window supports tracking the progress of the first task of the first application, modifying the appearance of an object of the application of the focused window based on the progress.

6. The method of claim 1, wherein the second application is operating in a window, and wherein the first object is a dynamic object that is unrestricted to one location in the window.

7. The method of claim 1, wherein the first task is a download, update, or installation process.

8. The method of claim 1, further determining the first task of the first application is a long running task exceeding a threshold;
responsive to the determination, updating the first object of the second application; and
otherwise prohibiting the updating of the first object.

9. The method of claim 1, further comprising providing a query, upon completion of the first task of the first application, in the second application, wherein the query is related to the first task of the first application.

10. A system for modifying an appearance of a first object in an electronic display of a computer device based on a progress of a first task, the system comprising:
a computer device;
a processor coupled to a memory, the processor configured to:
monitor the progress of the first task of a first application;
identify the first object of a second application;
update the appearance of the first object based on the progress of the first task, wherein the second application is distinct from the first application;
changing to a new application running in a focused window;
transitioning, from the first object of the second application to a new object of the new application to modify an appearance the new object based on the progress of the first task of the first application; and
modifying the appearance of the new object based on the progress of the first task.

11. The system of claim 10, further configured to access a configuration associated with the first object of the second application;
update the configuration of the first object; and
map the first object to at least one event type and to at least one visual customization for updating the appearance of the first object based on the progress of the first task.

12. The system of claim 10, further comprising being configured to simultaneously modify the first object of the second application based on a progress of the first task of the first application and modify a second object of the second application based on a progress of a second task of a third application, wherein the first application, the second application, and the third application are distinct from one another.

13. The system of claim 10, further comprising, responsive to a determination that an application of a focused window supports tracking the progress of the first task of the first application, modifying the appearance of an object of the application of the focused window based on the progress.

14. The system of claim 10, wherein the second application is operating in a window, and wherein the first object is a dynamic object that is unrestricted to one location in the window.

15. The system of claim 10, further determining the first task of the first application is a long running task exceeding a threshold;
responsive to the determination, updating the first object of the second application; and
otherwise prohibiting the updating of the first object.

16. A computer device for modifying an appearance of a first object in an electronic display of a computer device based on a progress of a first task, the computer device comprising:
an interface;
a processor coupled to a memory, the computer device configured to:
monitor the progress of the first task of a first application;
identify the first object of a second application;
update an appearance of the first object of the second application based on the progress of the first task, wherein the second application is distinct from the first application;
changing to a new application running in a focused window;
transitioning, from the first object of the second application to a new object of the new application to modify an appearance the new object based on the progress of the first task of the first application; and
modifying the appearance of the new object based on the progress of the first task.

17. The computer device of claim 16, further configured to simultaneously modify the first object of the second application based on a progress of the first task of the first application and modify a second object of the second application based on a progress of a second task of a third application, wherein the first application, the second application, and the third application are distinct from one another.

* * * * *